No. 747,379. Patented December 22, 1903.

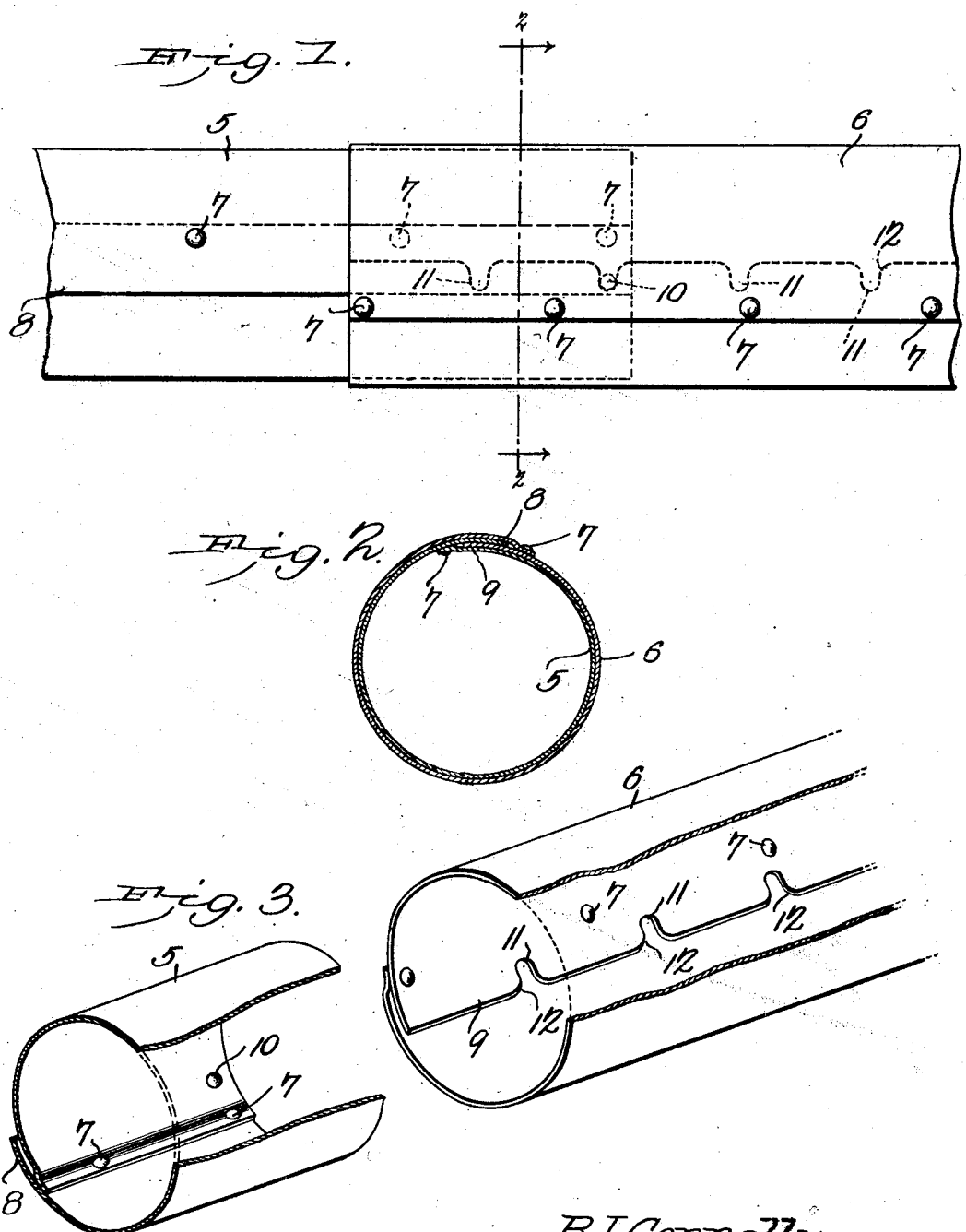

UNITED STATES PATENT OFFICE.

ROBERT ISAIAH CONNELLY, OF LAGRANGE, AND ISAIAH WOLFE READ, OF MONROE CITY, MISSOURI.

ADJUSTABLE STOVEPIPE.

SPECIFICATION forming part of Letters Patent No. 747,379, dated December 22, 1903.

Application filed July 30, 1903. Serial No. 167,607. (No model.)

*To all whom it may concern:*

Be it known that we, ROBERT ISAIAH CONNELLY, residing at Lagrange, in the county of Lewis, and ISAIAH WOLFE READ, residing at Monroe City, in the county of Monroe, State of Missouri, citizens of the United States, have invented a new and useful Adjustable Stovepipe, of which the following is a specification.

This invention relates to an improved pipe-joint especially designed for coupling one or more sections of stovepipe, and has for its object to provide a simple, inexpensive, and efficient device of this character by means of which the several sections of pipe may be readily adjusted longitudinally and securely locked in adjusted position.

A further object of the invention is to provide the several sections of pipe with lap-joints, the inner lip of one section being provided with a series of locking notches or recesses adapted to receive a locking-pin secured to the outer lip of the adjacent section, thereby preventing independent rotary and longitudinal movement of said pipe-sections.

The invention consists in the construction and novel combination and arrangement of parts hereinafter fully described, illustrated in the accompanying drawings, and pointed out in the claims hereto appended, it being understood that various changes in form, proportions, and minor details of construction may be resorted to without departing from the spirit or sacrificing any of the advantages of this invention.

Figure 1 is a side elevation of two sections of stovepipe provided with our improved joint. Fig. 2 is a vertical section view on the line 2 2 of Fig. 1. Fig. 3 is a detail perspective view, partly in section, of the two sections of pipe detached.

Similar numerals of reference indicate corresponding parts in all the figures of the drawings.

In the accompanying drawings, 5 and 6 designate two sections of stovepipe, preferably cylindrical in shape and formed of metal or other suitable material, each section having its overlapping edges fastened together by rivets 7 or other securing means. The pipes 5 and 6 are preferably telescopic, as shown, the outer edge of the pipe 5 being extended beyond the securing means to form a lip 8 and the inner edge of the pipe 6 being also extended beyond the securing means to form a similar lip 9, the lips 8 and 9 forming a lap-joint when the two sections of pipe are coupled, as clearly shown in Fig. 2 of the drawings.

A lug or rivet 10 is secured to one end of the pipe 5 at a point adjacent the free edge of the lip 8, said lug being adapted to engage one of a series of locking notches or recesses 11, formed in the free edge of the lip 9 and by means of which the two sections of pipe may be adjusted longitudinally and securely locked in the desired position. The notches 11, any number of which may be employed, are arranged at suitable distances apart on lip 9, each notch being formed with a flaring mouth 12 to facilitate the introduction of the locking-lug 10 when the sections of pipe are coupled.

In operation the end of the pipe 5 having the locking-lug secured thereto is introduced into the pipe 6, with the lip 8 engaging the recess formed by the lip 9 on the adjacent section of pipe. The section 5 is then forced inwardly until the desired adjustment is obtained, and by giving said pipe a slight rotary movement it will cause the locking-lug 10 to engage the corresponding notch in the lip 9, securely locking the two sections and at the same time cause the lip 8 to engage the securing means on the pipe 6 and the lip 9 to engage the securing means on the pipe 5, forming a perfect lap-joint. It is evident to vary the length of the pipe it is only necessary to revolve one section of the same until the locking-lug is disengaged from the notch, when the pipe is free to be lengthened or shortened or entirely removed at will.

It will be observed that the lips 8 and 9 not only form a lap-joint when the sections of pipe are coupled, but also serve to guide the pipes when introduced one within the other and hold the same in the proper position for engagement with the locking means when either section is rotated. It will also be observed that the pipe-sections may be adjusted longitudinally without the necessity of cutting a pipe-joint, with the consequent loss in case a longer pipe is afterward desired, and that said adjustment may be readily effected without the employment of skilled labor.

Having thus described the invention, what is claimed is—

1. An adjustable stovepipe comprising two telescopic pipe-sections, each having one edge thereof extended beyond the securing means to form a longitudinally-disposed lip, said lips being adapted to engage each other and form a lap-joint when the pipe-sections are coupled.

2. An adjustable stovepipe comprising two telescopic sections of pipe each section being provided with a longitudinally-disposed lip adapted to engage the lip on the adjacent section when said sections are coupled, and means carried by the lips for locking the pipe-sections together.

3. An adjustable stovepipe comprising two telescopic sections of pipe, each section being provided with a longitudinally-disposed lip adapted to engage the lip on the adjacent section when said sections are coupled, recesses formed in one of the lips and a lug secured to the other and adapted to engage said recesses.

4. An adjustable stovepipe comprising two telescopic sections of pipe, each section being provided with a longitudinally-disposed lip adapted to engage the lip on the adjacent section when said sections are coupled, notches or recesses formed in the free edge of one of the lips, and a pin or lug secured to the opposite lip at one end thereof and adapted to engage said recesses.

5. An adjustable stovepipe comprising two telescopic sections of pipe, the outer edge of one of the sections being extended beyond the securing means to form a longitudinally-disposed lip and provided with a locking-lug and the inner edge of the opposite section being extended beyond the securing means to form a similar lip having notches formed in the free edge thereof adapted to receive the locking-lug.

In testimony that we claim the foregoing as our own we have hereto affixed our signatures in the presence of two witnesses.

ROBERT ISAIAH CONNELLY.
ISAIAH WOLFE READ.

Witnesses:
WM. CALLOWAY,
R. S. MCCLINTIC.